United States Patent
Broussard et al.

(10) Patent No.: US 7,926,102 B2
(45) Date of Patent: Apr. 12, 2011

(54) CONFIDENTIAL CONTENT SEARCH ENGINE METHOD

(75) Inventors: Scott J. Broussard, Cedar Park, TX (US); Tony C. Kwong, Jr., Cary, NC (US); Eduardo N. Spring, Round Rock, TX (US); Anthony W. Wrobel, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1338 days.

(21) Appl. No.: 11/336,224

(22) Filed: Jan. 20, 2006

(65) Prior Publication Data

US 2007/0180258 A1 Aug. 2, 2007

(51) Int. Cl.
*H04L 9/32* (2006.01)
(52) U.S. Cl. .............. 726/20; 726/19; 726/5; 726/18
(58) Field of Classification Search .......... 713/153, 713/163, 183, 193, 340, 164, 150, 100, 182, 713/189; 714/38, 49, 48, 35, 37, 100, 7, 714/9, 10; 726/22, 14, 13, 11, 34, 25, 26, 726/27, 28, 29, 30; 380/42, 55, 58, 46, 270, 380/255, 247; 382/225, 581; 375/340; 345/581, 345/55; 719/315, 330, 313, 314; 709/217, 709/203, 223, 237, 225, 229, 227, 201, 212, 709/213, 220, 200
See application file for complete search history.

(56) References Cited

U.S. PATENT DOCUMENTS

| | | | |
|---|---|---|---|
| 6,070,244 A | 5/2000 | Orchier et al. | |
| 6,360,215 B1* | 3/2002 | Judd et al. | 707/3 |
| 6,678,827 B1 | 1/2004 | Rothermel et al. | |
| 6,735,701 B1 | 5/2004 | Jacobson | |
| 7,051,157 B2 | 5/2006 | James | |
| 7,231,668 B2 | 6/2007 | Jacobson | |
| 2002/0069098 A1* | 6/2002 | Schmidt | 705/7 |
| 2003/0005302 A1* | 1/2003 | Searle | 713/176 |
| 2003/0079132 A1 | 4/2003 | Bryant | |
| 2003/0088784 A1 | 5/2003 | Ginter et al. | |
| 2003/0145017 A1* | 7/2003 | Patton et al. | 707/104.1 |

(Continued)

OTHER PUBLICATIONS

"About Google Desktop", Google, Inc., http://desktop.google.com/about.html, 4 pages.

(Continued)

*Primary Examiner* — Brandon S Hoffman
*Assistant Examiner* — Nega Woldemariam
(74) *Attorney, Agent, or Firm* — Stephen R. Tkacs; Stephen J. Walder, Jr.; David A. Mims, Jr.

(57) ABSTRACT

A confidential content search engine method is provided. With the method, a security compliance search engine is provided for searching one or more client computing devices for items of information that meet a security criteria identifying items of information containing confidential content. Results of the search are provided to an analysis engine for determining if the items of information identified by the search are being maintained in accordance with a security policy for ensuring the confidentiality of the confidential content. Results of the analysis may be used to generate a report or log and to generate a notification to the client computing device identifying any violations of the security policy and possible solutions for bringing the item of information into compliance with the security policy. In addition, an administrator may be notified of any violations so that corrective action may be taken.

20 Claims, 4 Drawing Sheets

U.S. PATENT DOCUMENTS

| | | |
|---|---|---|
| 2003/0212862 A1 | 11/2003 | James |
| 2004/0059920 A1 | 3/2004 | Godwin |
| 2004/0181690 A1 | 9/2004 | Rothermel et al. |
| 2004/0193870 A1* | 9/2004 | Redlich et al. ............... 713/154 |
| 2004/0225645 A1 | 11/2004 | Rowney et al. |
| 2004/0260818 A1 | 12/2004 | Valois et al. |
| 2005/0010820 A1 | 1/2005 | Jacobson |
| 2005/0027981 A1 | 2/2005 | Baum-Waidner et al. |
| 2005/0076023 A1 | 4/2005 | Wu et al. |
| 2005/0183143 A1 | 8/2005 | Anderholm et al. |
| 2005/0257267 A1 | 11/2005 | Williams et al. |
| 2006/0048224 A1 | 3/2006 | Duncan et al. |
| 2006/0106793 A1* | 5/2006 | Liang ............................... 707/5 |
| 2006/0136570 A1* | 6/2006 | Pandya ......................... 709/217 |
| 2006/0140182 A1* | 6/2006 | Sullivan et al. ............... 370/389 |
| 2007/0261099 A1 | 11/2007 | Broussard et al. |
| 2008/0040776 A1 | 2/2008 | Bauer et al. |
| 2008/0235196 A1 | 9/2008 | Broussard et al. |
| 2008/0235760 A1 | 9/2008 | Broussard et al. |
| 2008/0270207 A1 | 10/2008 | Santos et al. |
| 2008/0276086 A9* | 11/2008 | Proudler ....................... 713/165 |

OTHER PUBLICATIONS

U.S. Appl. No. 11/381,151, filed May 2, 2006, Broussard et al.
USPTO U.S. Appl. No. 11/381,151, 3 pages.
USPTO U.S. Appl. No. 12/129,072, 2 pages.
USPTO U.S. Appl. No. 12/130,148, 3 pages.
Examiner's Answer mailed Nov. 4, 2010 for U.S. Appl. No. 12/129,072, 84 pages.
Response to Final Office Action filed Nov. 30, 2010, U.S. Appl. No. 12/130,148, 12 pages.

* cited by examiner

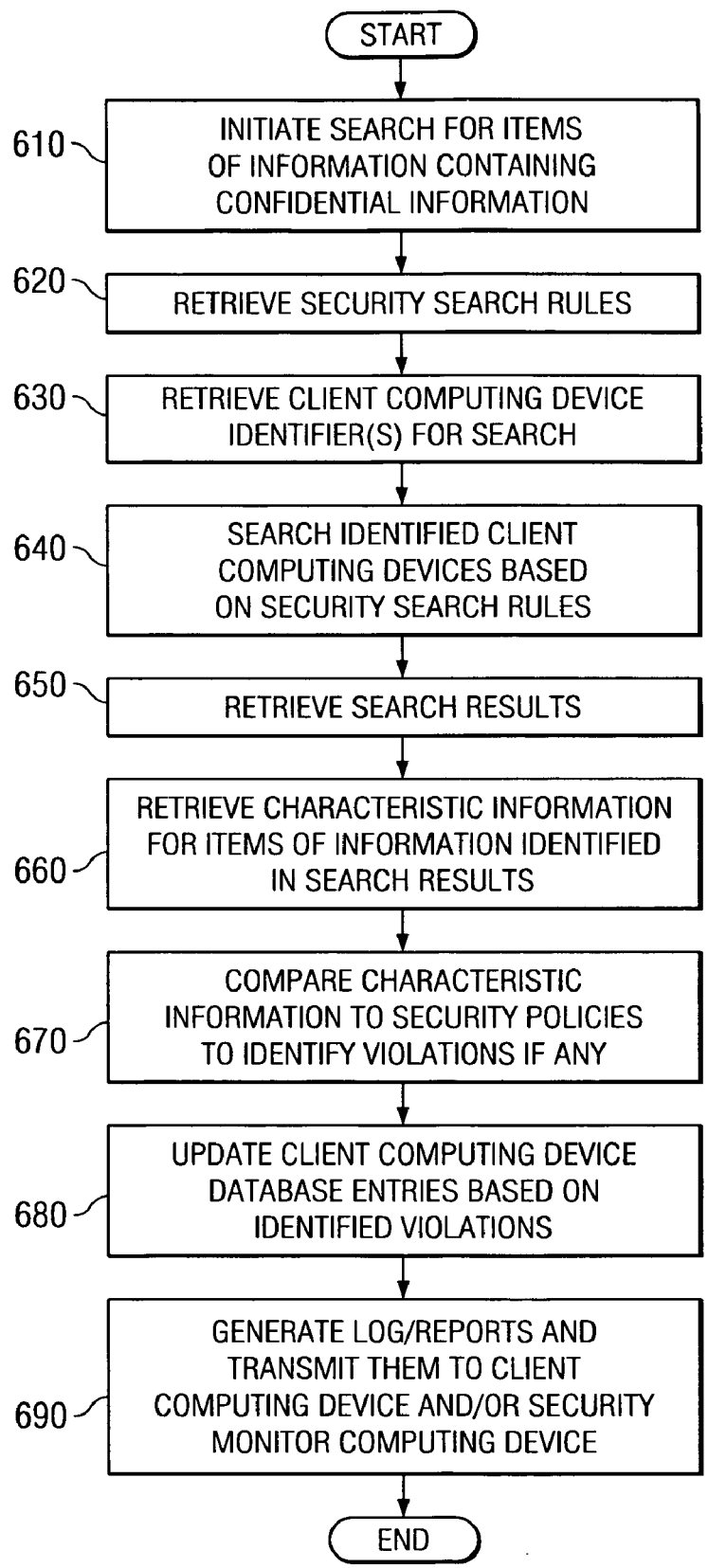

CONFIDENTIAL CONTENT SEARCH ENGINE METHOD

BACKGROUND OF THE INVENTION

1. Technical Field

The present invention relates generally to an improved data processing system and method. More specifically, the present invention is directed to a system and method for searching a computing device for confidential content and reporting back any policy violations.

2. Description of Related Art

Maintaining the security of confidential files, e.g., image files, document files, data files, and the like, is a major concern for both government and business organizations. If an organization is not able to control the dissemination of their confidential files, many potentially harmful disclosures of information may occur. The consequences of such harmful disclosures may cause an organization to lose market share, lose trade secrets, or, in the case of government organizations, may actually lead to placing individuals in harm's way.

Typically, an organization has a written policy for ensuring the security of such files, however the implementation of this written policy is left up to the individual employees of the organization. For example, an organization may require that all electronic mail attachments be encrypted, however it is left up to the employee to actually abide by the policy. Whenever a security policy is left up to a human being for implementation, a potential source of error exists where the security policy may not be followed, or at least may not be followed in every situation.

Recently, desktop search engines have been developed for searching a user's own computer. These desktop search engines are client resident programs that search and index electronic mail, files, web browser history, and instant messages on a client computer's storage device. Examples of such desktop search engines include Google Desktop™, X1 Desktop™, and Microsoft Windows Vista™.

With these desktop search engines, a user may enter search terms into a field of the search engine and the search engine will search the electronic mail, files, web browser history, and instant messages to identify those entities that contain that search term. The search term may be found in the content of the entity, meta-tags of the entity, or the like. Results of the search may then be provided to the user. In this way, the user is able to obtain easy access to information on their personal computer by performing a text, search term based, search.

SUMMARY OF THE INVENTION

In one illustrative embodiment, a method is provided, in a data processing system, for searching a client computing device to identify items of information containing confidential information. The method may comprise retrieving one or more security search rules setting forth one or more security criteria for identifying items of information that contain confidential information and performing a security search one or more client computing devices to identify at least one item of information stored on a given client computing device within the one or more client computing devices meeting the one or more security criteria. Search results of the security search may be retrieved and analyzed to determine if the at least one item of information meets security policy compliance requirements. A report may be generated based on results of the analysis of the search results. The security policy compliance requirements may identify requirements for maintaining items of information that contain confidential information in a confidential state. Generating the report based on results of the analysis of the search results may comprise providing a notification to the given client computing device indicating a violation of the security policy compliance requirements and a solution for placing the at least one item of information in compliance with the security policy compliance requirements.

In addition to the above, the illustrative embodiments provide a computer program product comprising a computer useable medium having a computer readable program. The computer readable program, when executed on a computing device, causes the computing device to perform the method previously described above.

Moreover, the illustrative embodiments further provide a system for searching a client computing device to identify items of information containing confidential information. The system may comprise a processor, a memory coupled to the processor, and a storage device coupled to the processor. The memory may comprise executable instructions which, when executed by the processor, cause the processor to perform the method previously described above.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart outlining an exemplary operation for determining compliance of items of information on a client computing device in accordance with an illustrative embodiment.

DETAILED DESCRIPTION OF THE PREFERRED EMBODIMENTS

Figure 1:
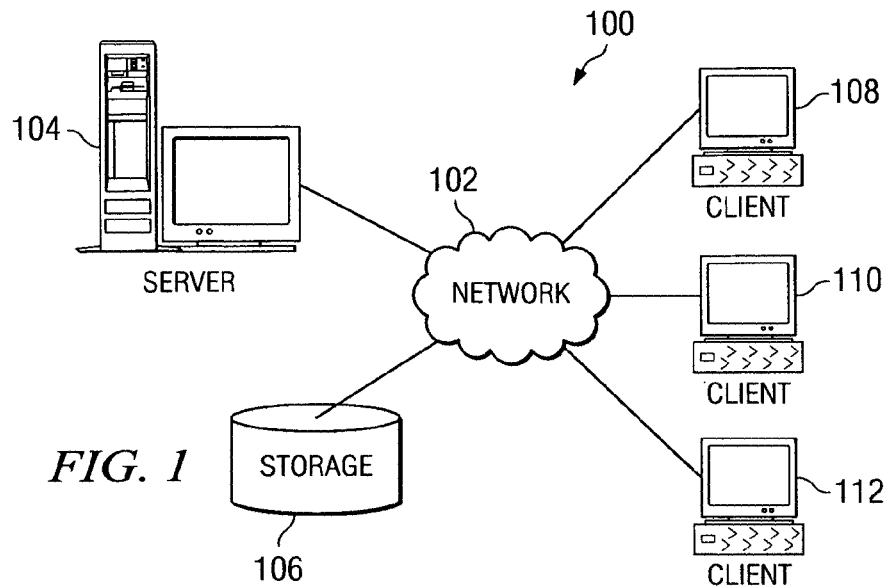
FIG. 1 is an exemplary block diagram of a distributed data processing system in which aspects of the illustrative embodiments may be implemented.
Figure 2:
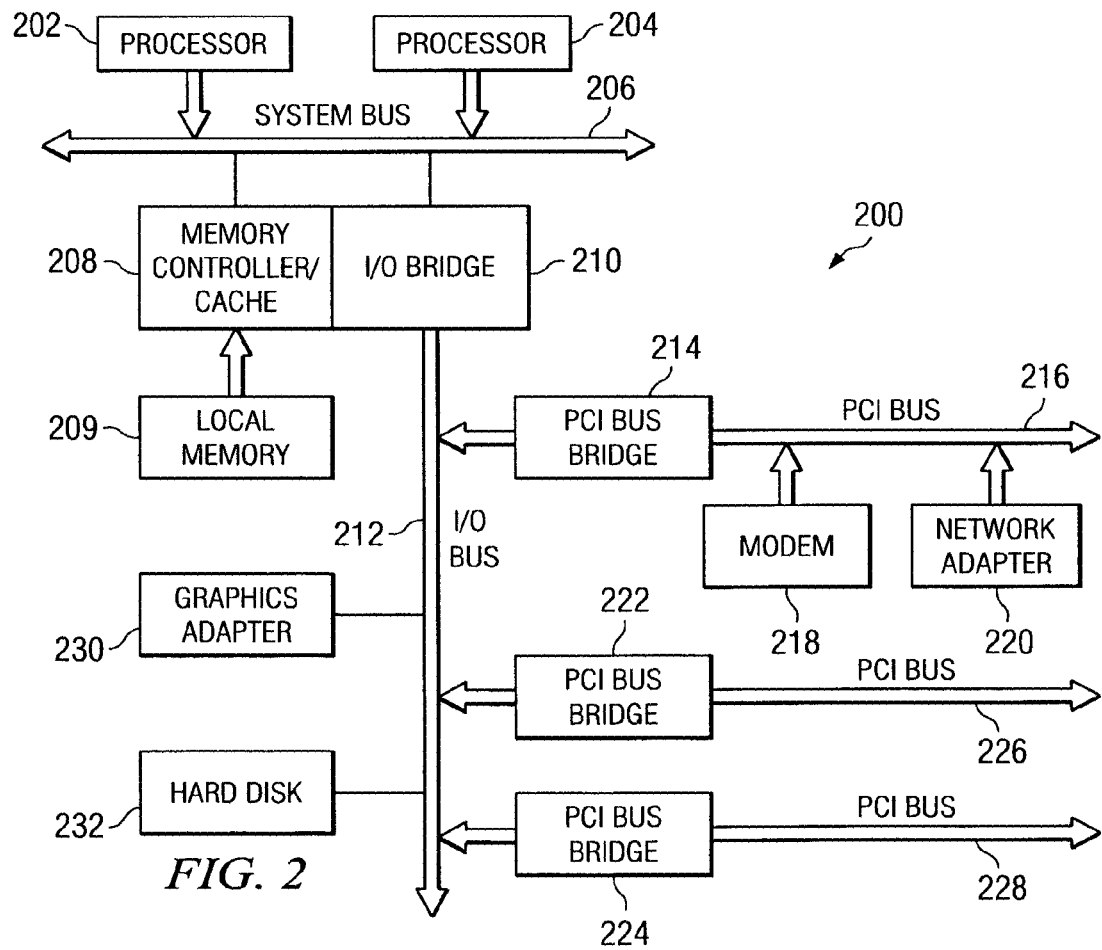
FIG. 2 is an exemplary block diagram of a server computing device in which aspects of the illustrative embodiments may be implemented.
Figure 3:
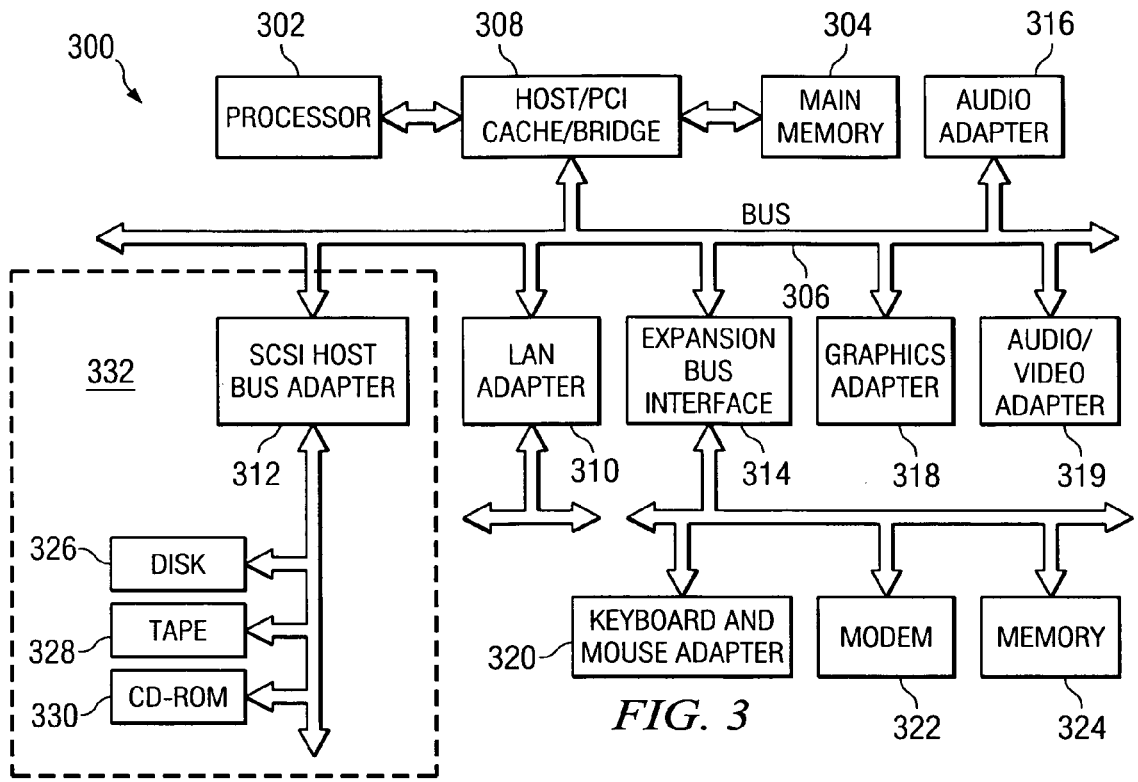
FIG. 3 is an exemplary block diagram of a client computing device in which aspects of the illustrative embodiments may be implemented.

The illustrative embodiments of the present invention provide mechanisms for ensuring compliance of client computing devices in the maintaining of items of information that contain confidential content. As such, the mechanisms of the illustrative embodiments are especially well suited for implementation in a distributed data processing system having a plurality of computing devices that communicate with one another by way of one or more networks. The following FIGS. 1-3 are provided as examples of a distributed data processing system, server computing device, and client computing device in which exemplary aspects of the illustrative embodiments may be implemented. It should be noted that the example computing environments illustrated in FIGS. 1-3 are not intended to state or imply any limitation as to the particular types of computing environments in which the exemplary aspects of the illustrative embodiments may be implemented. Rather, many modifications to the depicted computing environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards.

In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With reference again to FIG. 1, the illustrative embodiments provide a security compliance search engine that may be resident on server 104 and/or may be downloaded to client devices 108-112 from a server such as server 104. The security compliance search engine is provided for searching one or more client computing devices 108-112 for items of information that meet a security criteria established by an individual or organization. For example, the security compliance search engine searches for items of information that have confidential information.

The security compliance search engine uses a set of security search rules for determining how to locate and rate items of information that contain confidential information. The security search rules may be maintained on the server 104 or in a separate storage system, such as storage system 106 in FIG. 1. The security search rules may include, for example, rules for searching for particular character strings in the content of the item of information or in meta-information associated with the item of information, e.g., "Confidential," "SSN:," "Personal," "Private," "Secret," or the like. The security search rules may further include rules for searching indicators of confidentiality, e.g., data flags, particular parameters of the item of information being set, file system settings associated with the item of information, etc., in the content of the item of information or in meta-information associated with the item of information. Embodiments may also comprise rules for searching file name patterns to identify items of information that contain confidential information. The rules may comprise subsets of rules for various types of items of information, e.g., subsets of rules for various file types, formats, and the like.

The security compliance search engine, on server 104 for example, may remotely administer searches of client computing devices 108-112. The security compliance search engine may make use of a client computing device database, which may be stored on the server or another storage system such as storage system 106, to retrieve information about the client computing devices 108-112 that are to be searched using the mechanisms of the security compliance search engine.

In remotely administering searches of client computing devices 108-112, the security compliance search engine may download or transfer a client agent to the client computing devices 108-112 which runs the client agent to collect information from the client computing device 108-112 and provide the information back to the server 104. For example, the client agent may collect information about the items of information present on the client computing device and provide this information, in a secure manner, back to the server for analysis using the security search rules. Alternatively, the client agent may actually perform the search of the items of information on the client computing device 108-112 using the security search rules present on the server 104.

For items of information meeting one or more criteria set forth in the security search rules, characteristic information may be gathered about these items of information. This characteristic information may comprise, for example, identification of the item of information, the criteria met by the item of information, characteristic information about the item of information, information identifying the protection mechanisms currently applied to the item of information on the client computing device, and the like. This characteristic information may be used by the security compliance search engine to determine if the item of information is being maintained in accordance with established security policies.

The security compliance search engine may use the characteristic information gathered about the item of information to identify one or more security policies in a security policy database, which may also be stored on the server 104 or a separate storage system such as storage system 106, that apply to that item of information. The one or more security policies may then be applied to the characteristic information gathered about the item of information to determine if the item of information is being maintained in compliance with applicable security policies. Results of the application of the one or more security policies may be logged and maintained in the client computing device database, for example. In addition, the results may be used to generate reports and notifications that are sent to the client computing device 108-112 and/or an administrator's computing device. In this way, the user of the client computing device 108-112 and/or the administrator may be notified of any violations of the security policy by items of information maintained on the client computing device 108-112. Moreover, solutions for placing the item of information in compliance with the security policy may be provided as part of the log, report and/or notification.

In a further embodiment, the security compliance search engine may be distributed from the server 104 to the client computing devices 108-112 such that the security compliance search engine is run on the client computing device 108-112 and results are provided back to the server 104 for logging and reporting. In such an embodiment, the security search rules may be provided to the client computing devices 108-112 such that these rules are applied by the client-based security compliance search engine in searching the client computing device 108-112 upon which the client-based security compliance search engine runs. Because these security search rules may be updated from time to time, the client-based security compliance search engine may periodically communicate with the server 104 to download the most recent updates to the security search rules to the client computing devices 108-112.

Results of the security search of the client computing device 108-112 may be returned to the server 104 which may then apply the security policies to these search results as discussed previously. Alternatively, in a similar manner as the security search rules, the security policies may be downloaded to the client computing devices 108-112 such that the application of the security policies to the results of the security search may be performed on the client computing device 108-112. Results of the application of the security policies to the results of the security search may be logged and maintained in the server 104 and/or the client computing device 108-112 and may be reported to the user of the client computing device 108-112 and/or an administrator in a similar manner as previously discussed.

The security compliance search engine may be run on the client computing devices 108-112 in accordance with a schedule established by a user of the client computing device 108-112. The schedule is preferably established such that the security search is performed at a time when such a security search will not interfere with normal operation of the client computing device 108-112 by a user. Alternatively, the security compliance search engine may include a module for monitoring the current activity of the client computing device 108-112 and may initiate the security search at a time of detected inactivity of the client computing device 108-112. For example, if the client computing device 108-112 enters a sleep state, e.g., such as when a screensaver is initiated, or the user logs-out of the client computing device 108-112 but leaves the client computing device 108-112 running, the security compliance search engine may initiate a security search of the client computing device 108-112.

In addition, in order to ensure that the security compliance search engine is run periodically on the client computing devices 108-112, the server 104 may maintain information in the client computing device database identifying a last time that the security compliance search engine was run on each client computing device 108-112. The server 104 may remotely initiate the running of the security compliance search engine on the client computing device 108-112 when the elapsed time from the last time the security compliance search engine was run on that client computing device 108-112 exceeds a predetermined threshold.

As mentioned above, the security compliance search engine makes use of security search rules that govern the manner by which the security compliance search engine identifies items of information that contain confidential information. These items of information may be, for example, electronic documents, electronic images, electronic files, compilations of data, objects in an object oriented environment, or other units of data. Security search rules may be established for various types of items of information, e.g., various file formats such as Microsoft Word™ documents, Adobe Acrobat™ documents, JPEG image files, bitmap image files, Freelance Graphics™ files, Microsoft PowerPoint™ files, Microsoft Excel™ files, and the like. Security search rules may be established for identifying particular filename patterns indicative of confidential information being contained in the files, e.g., a filename with the string "secret," "confidential," "_c," "_s," or the like.

The security search rules may further designate text strings to be looked for in the actual content of the item of information. Thus, for example, a security search rule may look into the content of an electronic document to determine if the electronic document includes the word "confidential" as a title item in the electronic document, includes a text string "SSN:" indicative of a person's social security number, or the like. Other security search rules may be established for identifying, either in the content of the items of information, in the filenames of the items of information, meta-information describing the item of information, or the like, indicators of confidentiality of the item of information. The particular security search rules that are used will depend upon the particular implementation of the illustrative embodiments according to the particular interests and concerns of the individual or organization using the illustrative embodiments of the present invention.

The security search rules, as applied by the security compliance search engine, provide a mechanism for identifying those items of information on a client computing device that contain confidential information. Having identified those items of information, the security compliance search engine uses security policies to determine if the manner by which those items of information are being maintained meets with the security policies established by the individual or organization. In order to make such a determination, characteristic information regarding the items of information may be obtained from the client computing device and used with the security policies to determine if the item of information is being maintained in accordance with the security policies. This characteristic information may include, for example, a path to access the item of information, file system settings associated with the item of information (e.g., is the file a hidden file), archive settings for the item of information, whether the item of information is behind a firewall, whether the item of information is only accessible through a password mechanism, and the like. Security policies may be applied to such characteristic information to see if the security policies are met or not met by the particular manner in which the item of information is maintained on the client computing device.

For example, a security policy may be that all items of information that contain confidential information must be maintained in client computing devices in an encrypted format. If, during the security search, an item of information containing confidential information is identified, and the characteristic information obtained from the client computing device 108-112 indicates that the item of information is not encrypted, the client computing device 108-112 is determined to be maintaining the item of information in violation of the security policy. The security policy may further dictate, for example, that any items of information found to be in violation of the security policy must be viewed by the user of the client computing device no later than a specified number of days from a date of the security search or that the items of information must be viewed by the user by a certain time. In such a case, such items of information may be automatically deleted after viewing by the user, e.g., in the case of electronic mail items having confidential content.

As a result, the violation may be logged and a report sent to the user of the client computing device 108-112 and/or an administrator or other security monitor's computing device. This report may designate the security policy that has been violated, the item of information that has been determined to be in violation of the security policy, and may provide information as to how the user of the client computing device 108-112 may bring his client computing device 108-112 back into compliance with security policies with regard to the identified item of information. Other information may also be provided in the report in addition to, or in replacement of, the information noted above.

Thus, the illustrative embodiments of the present invention provide mechanisms for searching a client computing device for items of information that contain confidential information and obtaining characteristic information regarding the manner by which the item of information is being maintained in the client computing device. The illustrative embodiments further provide mechanisms for determining whether the manner by which the item of information is being maintained in the client computing device violates any established security policies. The illustrative embodiments also provide mechanisms for reporting security policy violations and providing information regarding how to bring client computing devices back into compliance with the established security policies.

Figure 4:
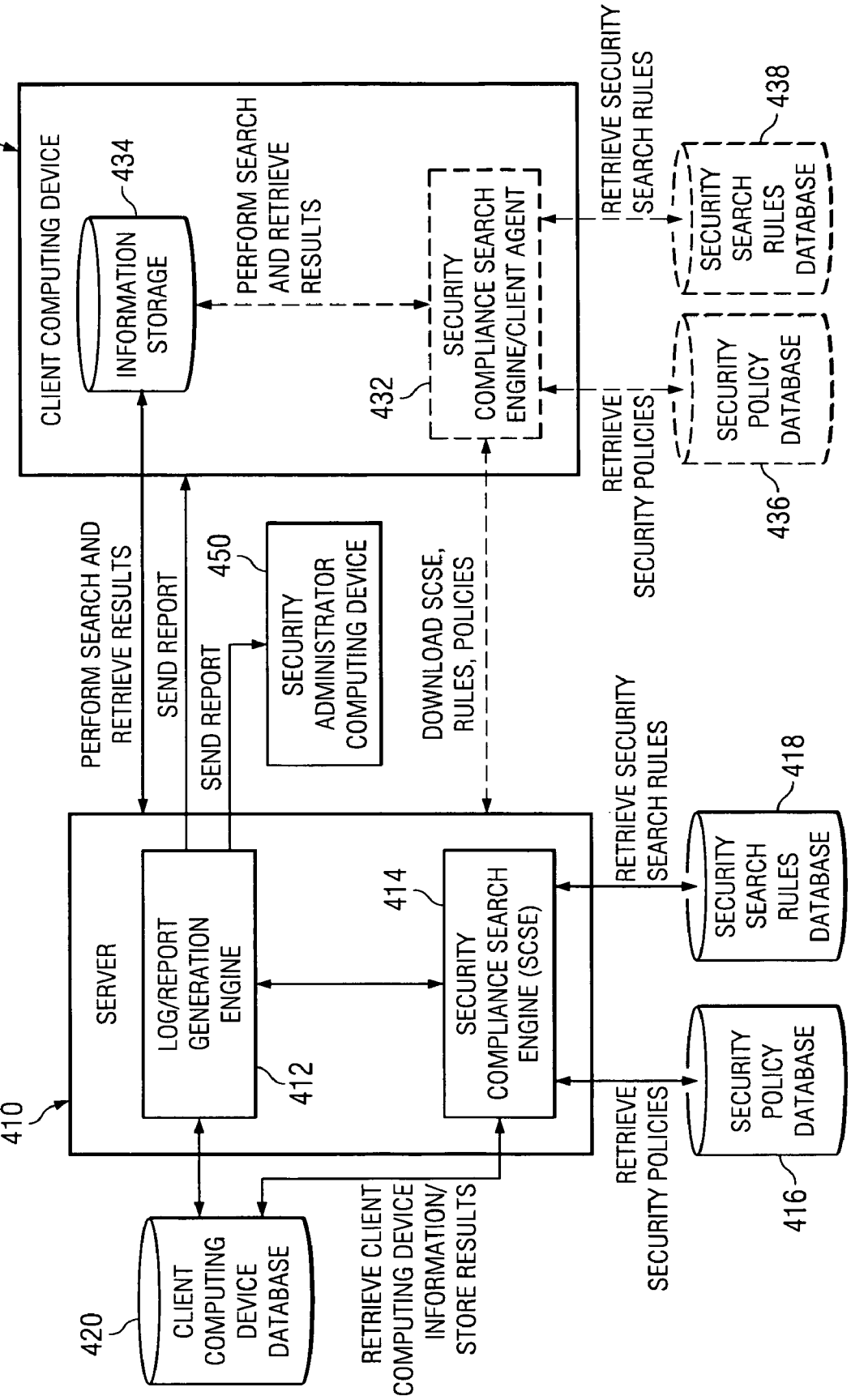
FIG. 4 is an exemplary diagram illustrating operational elements of an illustrative embodiment.

FIG. 4 is an exemplary diagram illustrating the primary operational elements of an illustrative embodiment. As shown in FIG. 4, a server 410 includes a security compliance search engine (SCSE) 414 and a log/report generation engine 412. The SCSE 414 has interfaces to security policy database 416, security search rules database 418, client computing device database 420, and log/report generation engine 412, as well as an interface for communicating, via the server 410, over one or more networks with the client computing device 430. The log/report generation engine 412 has interfaces to client computing device database 420 and SCSE 414, as well as an interface for communication, via the server 410, over one or more networks with the client computing device 430 and security administrator computing device 450.

The SCSE 414 obtains, from the security search rules database 418 security search rules for searching the client computing device 430 for items of information containing confidential content. The SCSE 414 obtains, from security policy database 416, security policies for application to results of a security search of the client computing device 430. These databases 416 and 418 may be regularly updated so as to maintain current the items of interest for security searches of client computing devices.

The SCSE 414 obtains client computing device information from client computing device database 420. This client computing device information may include, for example, network identifiers of the client computing devices, addresses, etc. for identifying the client computing devices that may be the subject of a security search in accordance with the illustrative embodiments. The client computing device database 420 may serve as storage for results of a security search and/or application of security policies to results of a security search.

The SCSE 414 communicates with the client computing device 430, using known network communication protocols, to perform a search of an information storage 434 of the client computing device 430. The information storage 434 may store many different types of items of information including electronic mail messages, instant messages, electronic files, electronic documents, electronic images, or other compilations of data. The information storage 434 may be an actual physical storage device, a plurality of physical storage devices, a portion of a physical storage device, a memory, or the like.

The SCSE 414 applies the security search rules obtained from the security search rules database 418 to the items of information maintained in the information storage 434 to thereby identify items of information in the information storage 434 that contain confidential information. Characteristic information regarding those items of information in the information storage 434 meeting one or more criteria set forth in one or more security search rules is retrieved from the client computing device 430 by the SCSE 414. The characteristic information may be stored in the client computing device database 420 for use with the security policies in determining whether the client computing device 430 is in compliance with current security policy.

The SCSE 414 may apply the security policies obtained from the security policy database 416 to the characteristic information retrieved from the client computing device 430 and generate results indicative of whether one or more of the security policies are violated by the manner in which the client computing device 430 is maintaining one or more items of information in the information storage 434. Information regarding any detected violations may be stored in correlation with entries in the client computing device database for the client computing device 430. These violations may also be notified to the SCSE 414 which may in turn notify the log/report generation engine 412.

The SCSE 414, for identified violations of security policies, may access security policy database 416 to identify suggested solutions for bringing the client computing device 430 into compliance with the established security policy. For example, an identifier of the security policy or policies violated by an item of information may be used to lookup a suggested solution in a data structure of the security policy database 416. This suggested solution information may be provided to the log/report generation engine 412 for use in generating logs and/or reports of the identified violations.

The log/report generation engine 412 may access the client computing device database 420 and/or receive notifications from the SCSE 414 in order to identify violations of security policy. In addition, the log/report generation engine 412 may obtain suggested solutions for identified violations from the SCSE 414 and/or the client computing device database 420. The log/report generation engine 412 generates logs and/or reports which may then be communicated to the client computing device 430 for display to a user of the client computing device 430. The logs and/or reports may also be provided to a security administrator computing device 450 so that a security administrator may be informed of violations occurring in system of client computing devices, including client computing device 430.

As mentioned previously, in some illustrative embodiments, the SCSE 414, a client agent of the SCSE 414, the security policies and security search rules may be downloaded to the client computing device 430, e.g., as SCSE/client agent 432. In such embodiments, the SCSE 414, or portions of the SCSE 414 may executed on the client computing device 414. In FIG. 4, these alternative illustrative embodiments are depicted by elements 432, 436 and 438 which are shown in ghost image to designate them as being part of alternative illustrative embodiments.

Figure 5:
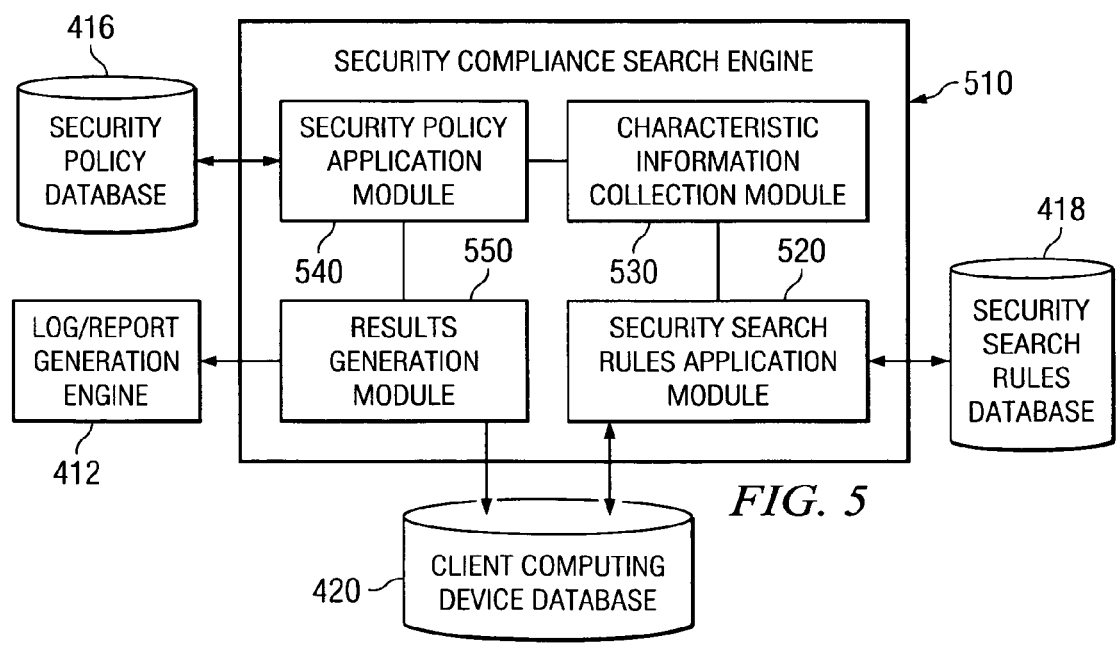
FIG. 5 is an exemplary diagram illustrating exemplary components of a security compliance search engine in accordance with an illustrative embodiment.

FIG. 5 is a diagram illustrating exemplary components of a security compliance search engine in accordance with an illustrative embodiment. As shown in FIG. 5, the security compliance search engine (SCSE) 510 includes a security search rules application module 520, a characteristic information collection module 530, a security policy application module 540, and a results generation module 550. The security search rules application module 520 is responsible for applying security search rules obtained from the security search rules database 418 to items of information in a client computing device. The characteristic information collection module 530 is responsible for collection information characteristic of the manner by which an item of information is maintained in a client computing device for items of information identified by the security search rules application module 520.

The security policy application module is responsible for applying security policies obtained from the security policy database 416 to the characteristic information collected by the characteristic information collection module 530 for items of information identified by the security search rules application module 520. The results generation module 550 is responsible for generating results of the application of the security policies to the characteristic information by the security policy application module 540. The results may be provided to the client computing device database 420 and/or to the log/report generation engine 412.

FIG. 6 is a flowchart outlining an exemplary operation for determining compliance of items of information on a client computing device in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 6, the operation starts by initiating a search for items of information containing confidential information (step 610). Security search rules are retrieved (step 620) and client computing device identifiers for the search are retrieved (step 630). Searches of the identified client computing devices are then performed based on the retrieved security search rules (step 640). Search results are retrieved from the client computing devices (step 650) and characteristic information is retrieved for items of information identified as containing confidential content (step 660).

The characteristic information is the compared to security policies to identify violations of the security policies, if any (step 670). The client computing device database entries may then be updated based on identified violations (step 680). Logs/reports of the violations may be generated and transmitted to the client computing device and/or a security monitoring computing device (step 690) and the operation terminates.

Thus, the present invention provides a mechanism for searching a client computing device for items of information that contain confidential content. Based on the results of the search, security policies may be applied to determine if the items of information that contain confidential content are being maintained on the client computing devices in accordance with established security policies. Any violations identified may be reported to a security monitor and/or to the user of the client computing device along with suggested solutions for bringing the client computing device into compliance with the established security policies. In this way, breaches of security policy may be quickly and easily identified in a network of client computing devices and solutions offered for ensuring the confidentiality of items of information containing confidential content.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for searching a client computing device to identify items of information containing confidential information, comprising:

retrieving one or more security search rules setting forth one or more security criteria for identifying items of information that contain confidential information;

performing a security search on one or more client computing devices to identify at least one item of information stored on a given client computing device within the one or more client computing devices meeting the one or more security criteria;

retrieving search results of the security search, wherein the search results of the security search contain the at least one item of information that meets the one or more security criteria;

analyzing the search results by applying security policy compliance requirements to the at least one item of information to determine if the at least one item of information meets the security policy compliance requirements; and generating a report based on results of the analysis of the search results, wherein the security policy compliance requirements identify requirements for maintaining items of information that contain confidential information in a confidential state, wherein generating the report based on results of the analysis of the search results comprises providing a notification to the given client computing device indicating a violation of the security policy compliance requirements and a solution for placing the at least one item of information in compliance with the security policy compliance requirements.

2. The method of claim 1, wherein the one or more security criteria comprise at least one of particular character strings indicative of confidential information, data flags indicative of confidential information, particular parameters associated with items of information indicative of confidential information, file system settings associated with items of information indicative of confidential information, file usage patterns indicative of confidential information, or file name patterns indicative of confidential information.

3. The method of claim 1, wherein the at least one item of information comprises at least one of an electronic mail, an electronic file, an electronic object in an object oriented environment, an electronic document, or an electronic image.

4. The method of claim 1, wherein the data processing system is a server computing device, and wherein the security search is performed on a plurality of client computing devices associated with the server computing device.

5. The method of claim 4, further comprising:

retrieving information from a client computing device database identifying the plurality of client computing devices on which to perform the security search.

6. The method of claim 1, wherein the data processing system is the given client computing device.

7. The method of claim 1, wherein performing the security search of the one or more client computing devices comprises;
    installing a client agent on the given client computing device; and
    executing the client agent on the given client computing device, wherein the client agent uses the retrieved one or more security rules to perform the security search of the given client computing device.

8. The method of claim 1, wherein retrieving search results of the security search comprises gathering characteristic information associated with the at least one item of information, wherein the characteristic information comprises at least one of an identity of the at least one item of information, the search criteria met by the at least one item of information, or information identifying a protection mechanism currently applied to the at least one item of information.

9. The method of claim 8, wherein analyzing the search results comprises:
    identifying one or more security policies in a security policy database that are to be applied to the at least one item of information based on the characteristic information gathered for the at least one item of information.

10. A computer program product comprising a computer recordable medium having a computer readable program recorded thereon, wherein the computer readable program, when executed on a data processing system, causes the data processing system to:
    retrieve one or more security search rules setting forth one or more security criteria for identifying items of information that contain confidential information;
    perform a security search on one or more client computing devices to identify at least one item of information stored on a given client computing device within the one or more client computing devices meeting the one or more security criteria;
    retrieve search results of the security search, wherein the search results of the security search contain the at least one item of information that meets the one or more security criteria;
    analyze the search results by applying security policy compliance requirements to the at least one item of information to determine whether the at least one item of information meets the security policy compliance requirements; and
    generate a report based on results of the analysis of the search results, wherein the security policy compliance requirements identify requirements for maintaining items of information that contain confidential information in a confidential state, wherein the computer readable program causes the data processing system to generate the report based on results of the analysis of the search results by providing a notification to the given client computing device indicating a violation of the security policy compliance requirements and a solution for placing the at least one item of information in compliance with the security policy compliance requirements.

11. The computer program product of claim 10, wherein the one or more security criteria comprise at least one of particular character strings indicative of confidential information, data flags indicative of confidential information, particular parameters associated with items of information indicative of confidential information, file system settings associated with items of information indicative of confidential information, file usage patterns indicative of confidential information, or file name patterns indicative of confidential information.

12. The computer program product of claim 10, wherein the at least one item of information comprises at least one of an electronic mail, an electronic file, an electronic object in an object oriented environment, an electronic document, or an electronic image.

13. The computer program product of claim 10, wherein the computer readable program causes the data processing system to perform the security search of the one or more client computing devices by:
    installing a client agent on the given client computing device; and
    executing the client agent on the given client computing device, wherein the client agent uses the retrieved one or more security rules to perform the security search of the given client computing device.

14. The computer program product of claim 10, wherein the computer readable program causes the data processing system to retrieve search results of the security search by gathering characteristic information associated with the at least one item of information, wherein the characteristic information comprises at least one of an identity of the at least one item of information, the search criteria met by the at least one item of information, or information identifying a protection mechanism currently applied to the at least one item of information.

15. The computer program product of claim 14, wherein the computer readable program causes the data processing system to analyze the search results to determine if the at least one item of information meets security policy compliance requirements by:
    identifying one or more security policies in a security policy database that are to be applied to the at least one item of information based on the characteristic information gathered for the at least one item of information.

16. A system for searching a client computing device to identify items of information containing confidential information, comprising:
    a processor;
    a memory coupled to the processor; and
    a storage device coupled to the processor, wherein the memory comprises computer executable instructions which, when executed by the processor, causes the processor to:
    retrieve, from the storage device, one or more security search rules setting forth one or more security criteria for identifying items of information that contain confidential information;
    perform a security search on one or more client computing devices to identify at least one item of information stored on a given client computing device within the one or more client computing devices meeting the one or more security criteria;
    retrieve search results of the security search, wherein the search results of the security search contain the at least one item of information that meets the one or more security criteria;
    analyze the search results by applying security policy compliance requirements to the at least one item of information to determine if the at least one item of information meets the security policy compliance requirements; and
    generate a report based on results of the analysis of the search results, wherein the security policy compliance requirements identify requirements for maintaining items of information that contain confidential information in a confidential state, wherein the instructions cause the processor to generate the report based on results of the analysis of the search results by providing a notification to the given client computing device indicating a violation of the security policy compliance requirements and a solution for placing the at least one item of information in compliance with the security policy compliance requirements.

17. The system of claim 16, wherein the one or more security criteria comprise at least one of particular character strings indicative of confidential information, data flags indicative of confidential information, particular parameters associated with items of information indicative of confidential information, file system settings associated with items of information indicative of confidential information, file usage patterns indicative of confidential information, or file name patterns indicative of confidential information.

18. The system of claim 16, wherein the at least one item of information comprises at least one of an electronic mail, an electronic file, an electronic object in an object oriented environment, an electronic document, or an electronic image.

19. The system of claim 16, wherein the processor performs a security search of the one or more client computing devices by:

installing a client agent on the given client computing device; and executing the client agent on the given client computing device, wherein the client agent uses the retrieved one or more security rules to perform the security search of the given client computing device.

20. The system of claim 16, wherein the processor:

retrieves search results of the security search by gathering characteristic information associated with the at least one item of information, wherein the characteristic information includes at least one of an identity of the at least one item of information, the search criteria met by the at least one item of information, or information identifying a protection mechanism currently applied to the at least one item of information, and identifies one or more security policies in a security policy database that are to be applied to the at least one item of information based on the characteristic information gathered for the at least one item of information.

* * * * *